(12) United States Patent
Lin

(10) Patent No.: US 7,051,649 B2
(45) Date of Patent: May 30, 2006

(54) COLLAPSIBLE BARBECUE GRILL ASSEMBLY

(76) Inventor: Chi-Fu Lin, No. 67, Yenhsing Rd., Yenchou Li, Yungkang City, Tainan Hsien (TW)

( * ) Notice: Subject to any disclaimer, the term of this patent is extended or adjusted under 35 U.S.C. 154(b) by 429 days.

(21) Appl. No.: 10/686,075

(22) Filed: Oct. 15, 2003

(65) Prior Publication Data
US 2005/0229794 A1    Oct. 20, 2005

(51) Int. Cl.
*A47J 37/00* (2006.01)
(52) U.S. Cl. .................... 99/449; 99/450; 126/9 B; 126/9 R
(58) Field of Classification Search ............. 99/339, 99/340, 444–450, 481, 482; 126/9 B, 9 R, 126/25 R, 38, 9 A, 25 A
See application file for complete search history.

(56) References Cited
U.S. PATENT DOCUMENTS

| | | | | |
|---|---|---|---|---|
| 366,833 A * | 7/1887 | Smith | ........................ | 248/431 |
| 4,024,851 A * | 5/1977 | Boda | ........................... | 126/30 |
| 4,120,280 A * | 10/1978 | Iverson et al. | ................ | 126/30 |
| 4,146,010 A * | 3/1979 | Manska | ........................ | 126/30 |
| 4,726,349 A * | 2/1988 | Gehrke | ...................... | 126/25 R |
| 4,732,138 A * | 3/1988 | Vos | ............................ | 126/25 A |
| 5,025,715 A * | 6/1991 | Sir | ........................ | 99/421 HV |
| D337,933 S * | 8/1993 | Gryz | ............................ | D7/332 |
| 5,850,829 A * | 12/1998 | Taylor et al. | ................. | 126/30 |

* cited by examiner

*Primary Examiner*—Timothy F. Simone
(74) *Attorney, Agent, or Firm*—Jackson Walker, LLP (57) ABSTRACT

A collapsible barbecue grill assembly has a top rack (20), a leg assembly attached under the top rack (20) and a foldable charcoal container (30) mounted on the top rack (20). The leg assembly is combined by means of wedging without using any tools. The top rack (20) is composed of two side frames (22a), (22b) and two panels (24a), (24b) pivotally connecting between the two side frames (22a), (22b). One joint of the panel and the side frames (22) is detachable to allow the top rack to be pivotally folded and the charcoal container (30) is foldable into a flat configuration. Therefore, the volume of the folded barbecue grill assembly is particularly low. Moreover, the barbecue grill assembly uses no trivial accessory and can be conveniently assembled without any tool.

8 Claims, 7 Drawing Sheets

COLLAPSIBLE BARBECUE GRILL ASSEMBLY

BACKGROUND OF THE INVENTION

1. Field of the Invention

The present invention relates to a barbecue grill assembly, and more particularly to a collapsible barbecue grill assembly that can be assembled or dissembled quickly and easily.

2. Description of Related Art

Commonly, conventional barbecue grills are not assembled when purchased. This makes commercial sense in that each barbecue grill requires less space during transportation to and stocking at the retailers, meaning more units may be transported in each shipment, thereby saving money for both the manufacturer and the retailer of the barbecue grill. In addition, this provides for easier transportation of the barbecue grill from the store by the purchaser or when the purchaser takes the barbecue grill out for camping. However, this also results in a number of potential problems. The purchaser has to either partially or fully assemble the barbecue grill prior to use. This can require added expense and possibly significant time on the part of the purchaser. For example, should the purchaser not already possess the tools required to assemble the barbecue grill, the purchaser will have to either borrow or purchase the tools. Additionally, the assembly of the barbecue grill may quite frequently be beyond the mechanical acumen of the purchaser, thereby, causing frustration and reduced consumer satisfaction in the overall product.

Furthermore, assembly by the purchaser increases both the chances of parts being lost during assembly and the barbecue grill being improperly assembled. Lost parts can lead to time and effort on the part of both the purchaser and manufacturer. First, the purchaser must secure another part before the barbecue grill assembly can be completed and the barbecue grill used. Hopefully, the missing part is in the retailer's stock system so that the part may be rapidly replaced. However, in all likelihood, the part will have to be procured from the manufacturer, leading to lengthy delays in the use of the barbecue grill. Second, because the barbecue grill is brand new, the purchaser will likely believe the missing part was not originally provided. Therefore, the manufacturer will have to replace the part free of change.

The present invention has arisen to mitigate or obviate the disadvantages of the conventional barbecue grill assembly.

SUMMARY OF THE INVENTION

The first objective of the present invention is to provide a collapsible barbecue grill assembly, which is easily assembled or dissembled.

The second objective of the present invention is to provide a collapsible barbecue grill, which uses no trivial accessory and so avoids otherwise failure of complete erection of the barbecue grill due to the missing accessory.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
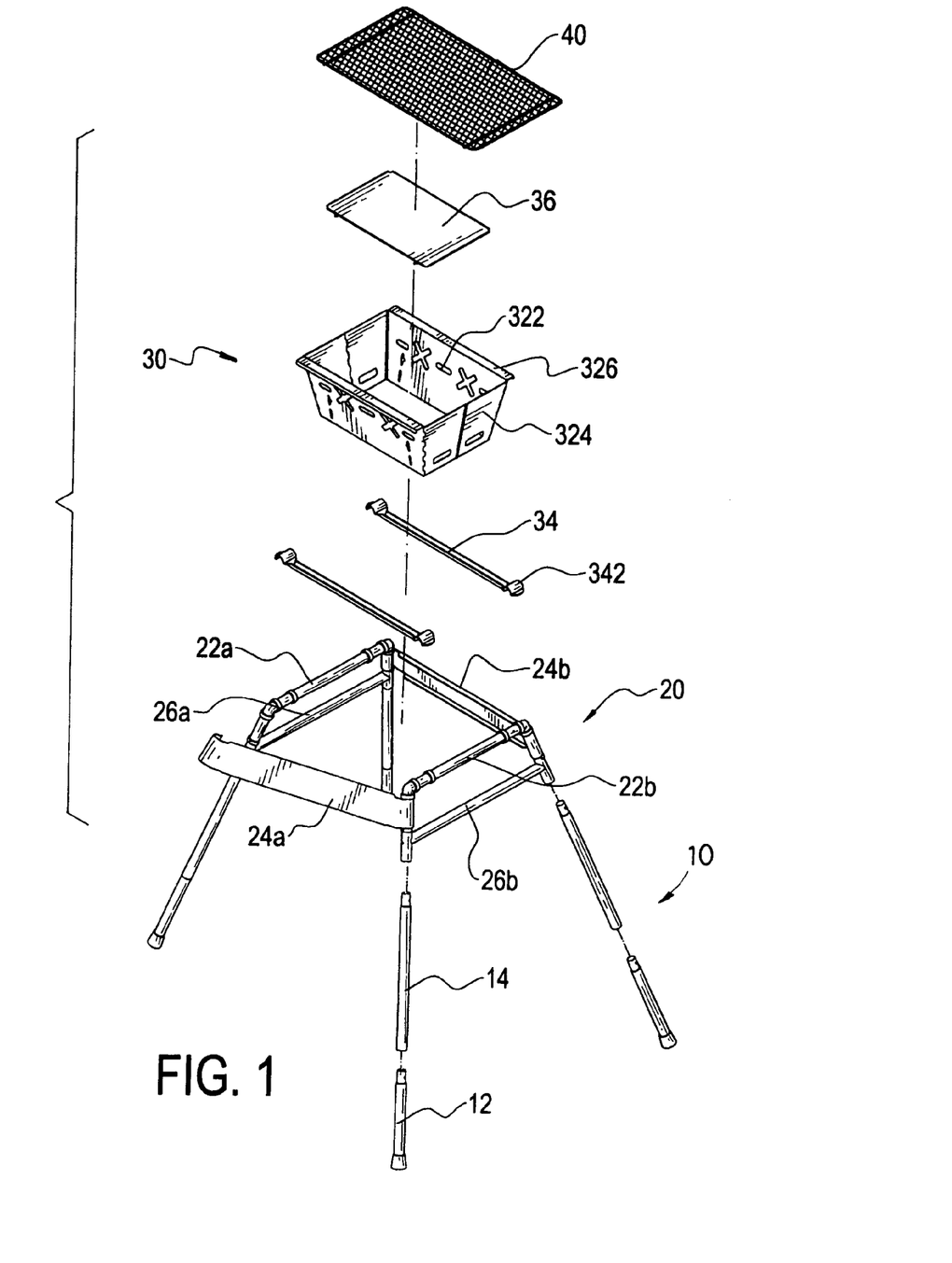
FIG. 1 is an exploded perspective view of a collapsible barbecue grill assembly in accordance with the present invention.
Figure 2:
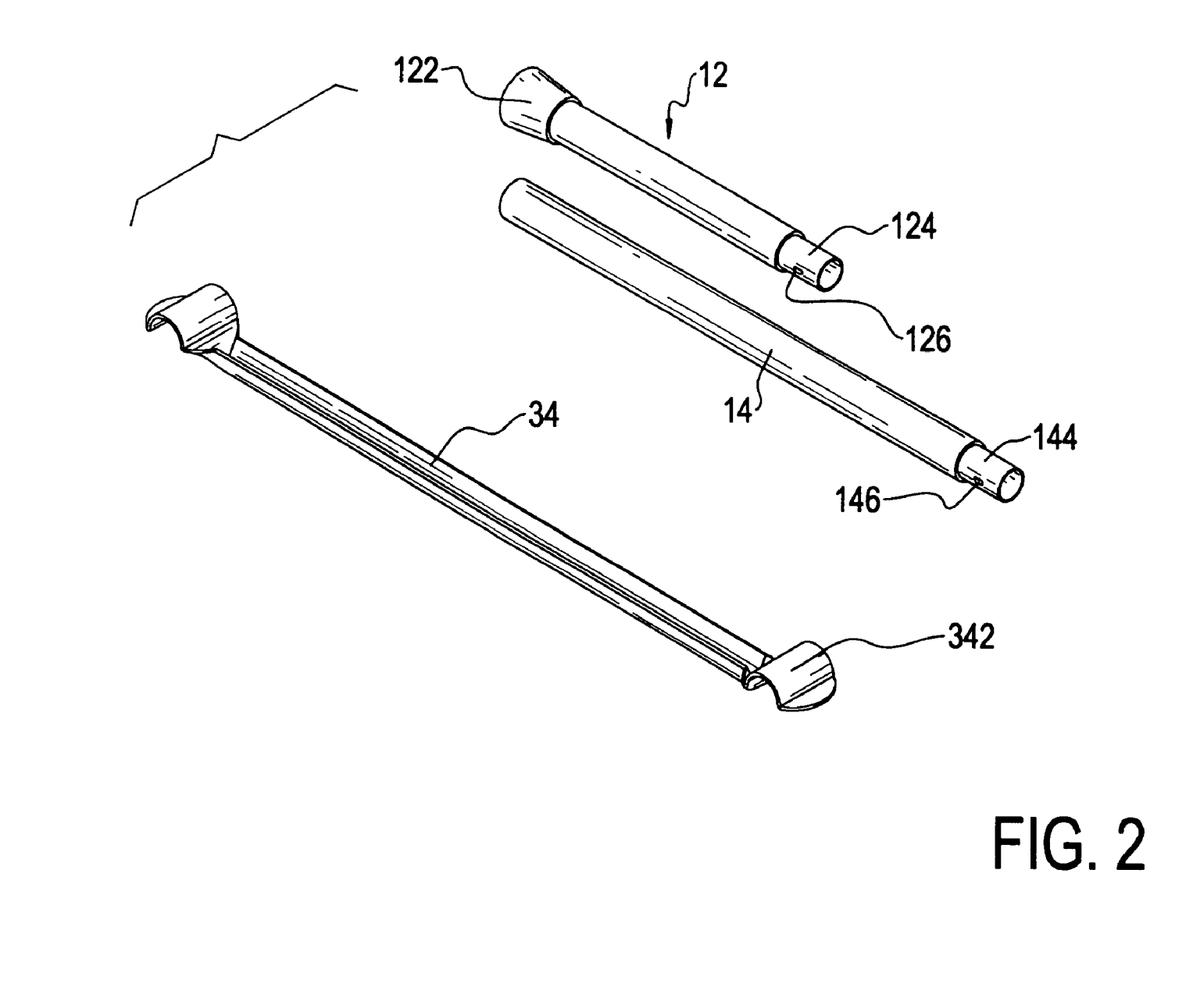
FIG. 2 is an exploded perspective view of part elements used on the collapsible barbecue grill assembly.

With reference to FIGS. 1 and 2, a collapsible barbecue in accordance with the present invention comprises a leg assembly (10), a foldable top rack (20), a foldable charcoal container (30), and optional a grill (40).

The leg assembly (10) is composed of four legs (not numbered) to connect with the top rack (20) and to support the top rack (20) above the ground. With further reference to FIG. 2, each leg has a grounding tube (12) with a connecting end (not numbered) and an abutting end (not numbered) and a middle tube (14) with an engaging end (not numbered) and an inserting end (not numbered). An enlarged rubber foot (122) is attached on the abutting end of the grounding tube (12) to provide a friction force to keep the top rack (20) steady. A narrow frustum (124) is formed on the connecting end of the grounding tube (12) and has a stub (126) formed on an outer periphery of the frustum (124).

The engaging end of the middle tube (14) has an inner diameter slightly smaller than an outer diameter of the frustum (124) to tightly receive the frustum (124) of the grounding tube (12). The engaging end further has a dent (not shown) formed on an inner periphery of the engaging end to mate with the stub (126) to keep the grounding tube (12) in position on the middle tube (14). The inserting end of the middle tube (14) is also a narrow frustum (144) with a stub (146).

Figure 4:
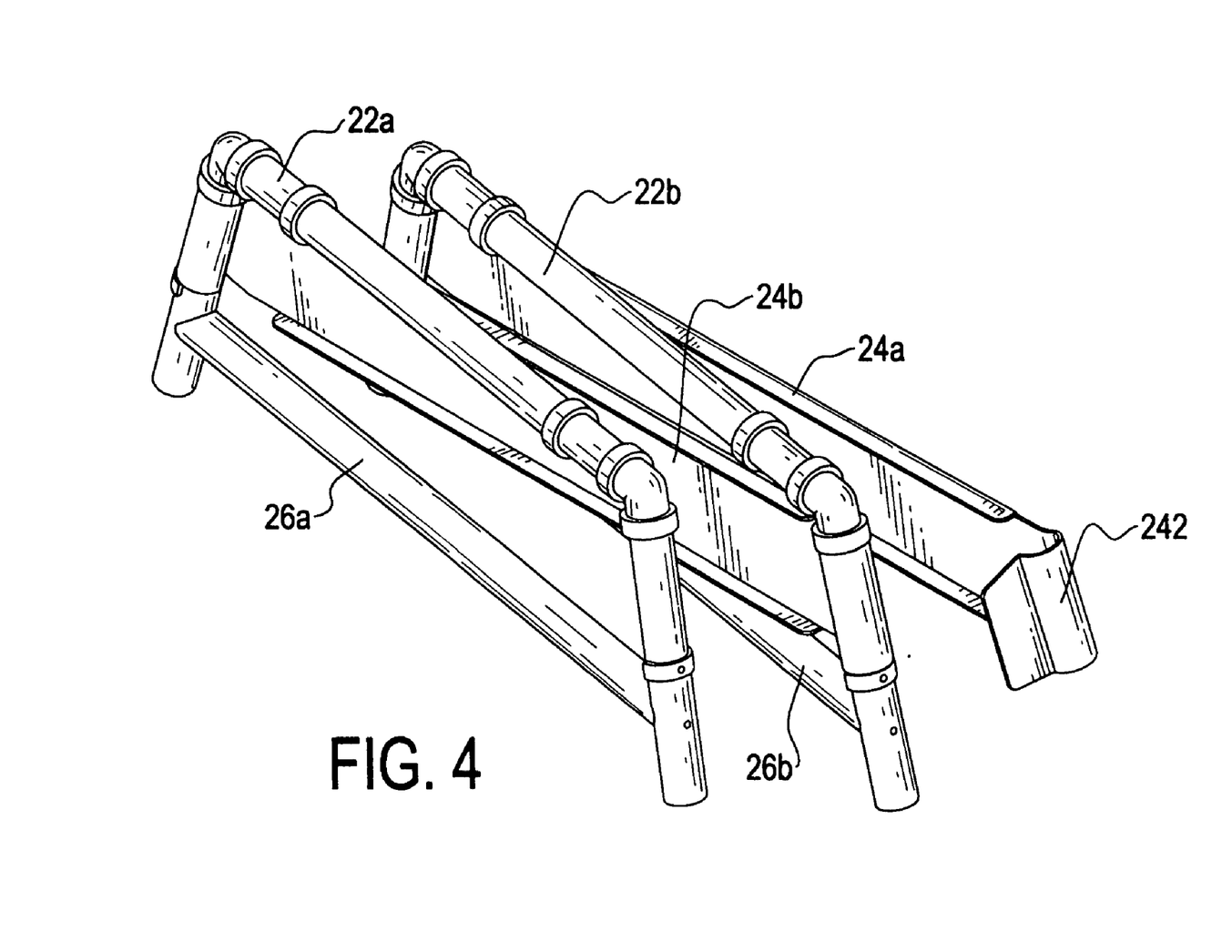
FIG. 4 is a perspective view of a top rack in the collapsible barbecue grill assembly.
Figure 5:
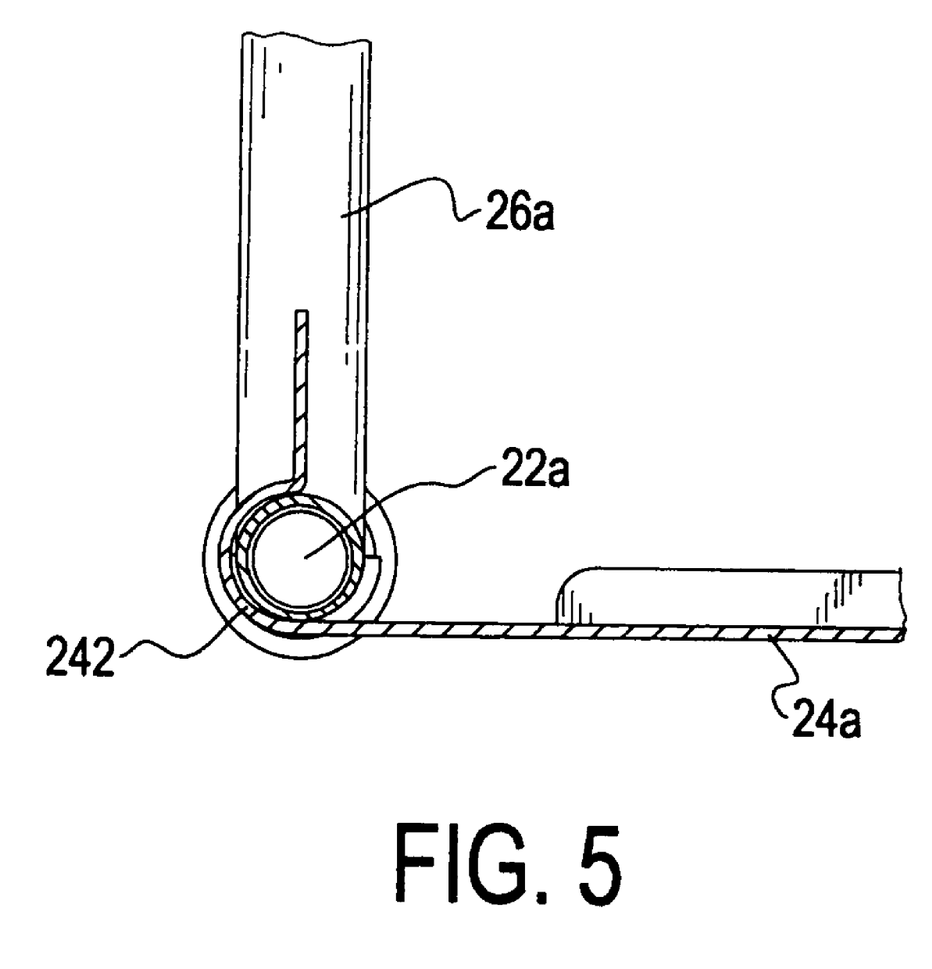
FIG. 5 is a partially cross-sectional top plane view of a pivotal end of the top rack.

The top rack (20) has two side frames (22*a*) (22*b*) and two panels (24*a*) (24*b*) pivotally connected between the two side frames (22*a*) (22*b*). With further reference to FIGS. 4 and 5, each side frame (22*a*) (22*b*) is an inverted U-shaped tube composed of a top (not numbered) and two arms (not numbered) and has an optionally horizontal member (26*a*) (26*b*) extending between the two arms. Each arm of the side frame (22*a*) (22*b*) has a distal end having an inner diameter slightly smaller than an outer diameter of the frustum (144) of the middle tube (14). The distal end of the arm on the side frame (22*a*) (22*b*) further has a dent (not shown) formed in an inner periphery to mate with the stub (146) on the frustum (144). Whereby, the middle tube (14) is detachably yet firmly attached on the top rack (20) by inserting the frustum (144) into the distal end of the arm. The panels (24*a*) (24*b*) are parallel connected between the two side frames (22*a*) (22*b*) at the arms, wherein each panel (24*a*), (24*b*) is a long strip with two ends and a curved collar (242) is formed on one end of the panel (24*a*) to hoop one corresponding arm. As shown in FIG. 4, only one curved collar (242) is formed on one corresponding end of the panel (24*a*), which surrounds more than half of the circumference of the arm to pivotally mount the panel (24*a*) on the arm. Other ends of the panel (24*a*) (24*b*) are respectively and undetachably sleeved on the corresponding arms to achieve the top rack (20). However, when the curved collar (242) is detached from the arm, the whole top rack (20) can be folded to reduce in size the top rack (20) by pivoting the panels (24a) (24b) around the side frames (22a) (22b). Moreover, the folded top rack (20) is still in one piece without taking elements apart so that the elements of the top rack (20) will not be lost after the barbecue grill assembly is disassembled. Additionally, reassembling the top rack (20) is also quick and easy by pivotally extending out the top rack (20).

Figure 3:
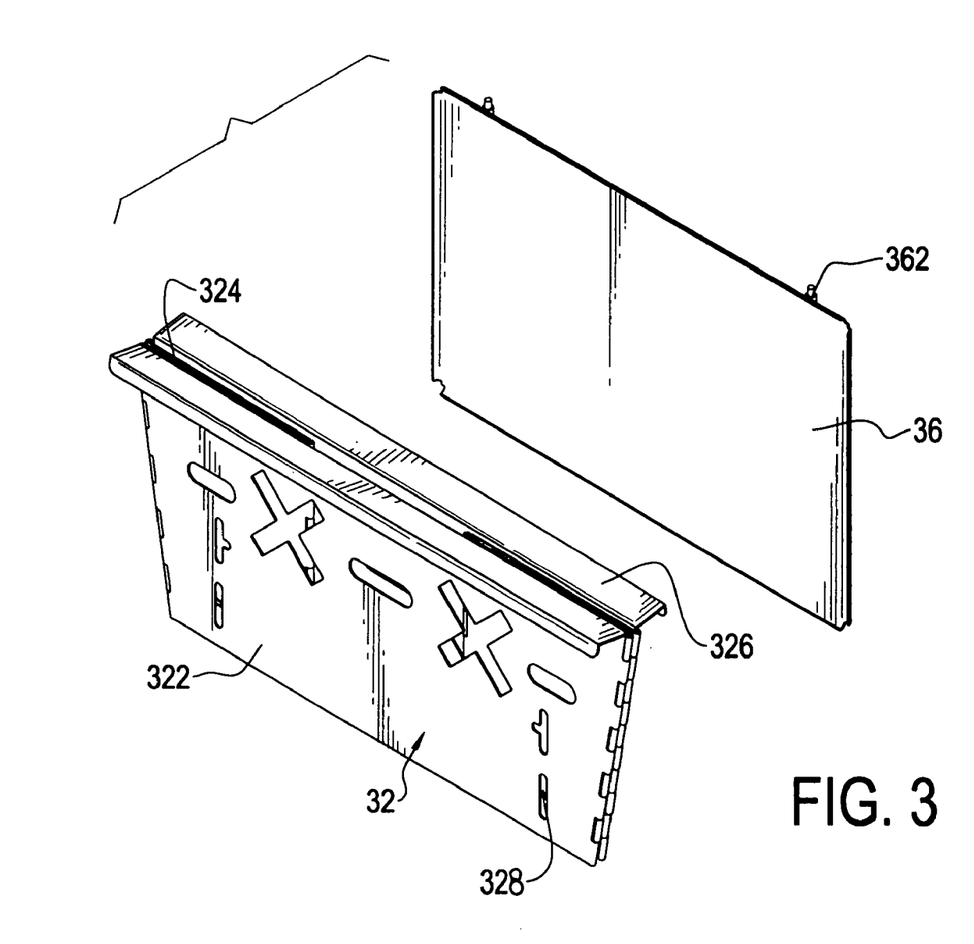
FIG. 3 is a perspective view of a charcoal container in the collapsible barbecue grill assembly.

With further reference to FIG. 3, the charcoal container (30) mounted on the top rack (20) is foldable and has two symmetrical bodies (32) to construct an enclosing wall with a top opening and a bottom opening, and a bottom plate (36) detachably attached on the enclosing wall to cover the bottom opening. Two holding strips (34) are parallel with each other and mounted between the two tops of the side frame (22a) (22b) at outer portions near the arms. As shown in FIG. 2, each holding strip (34) has two ends and two curved ears (342) respectively formed on the two ends to correspond to partial periphery of the top of the side frame (22a) (22b). Each symmetrical body (32) of the charcoal container (30) has a long side board (322) with two short sides and two long sides, two short wings (324) pivotally and respectively attached on the short sides of the long side board (322), and a top flange (326) extending outwardly at one long side near the top opening. Each wing (324) on one symmetrical body (32) has a distal end (not numbered) to pivotally connect with one corresponding distal end of the wing (324) on another symmetrical body (32) to construct the enclosing wall. Thereby, the enclosing wall is foldable by pivotally bending two adjacent wings (324) at pivot joints inward to make the charcoal container (30) flat. Optionally, multiple ventilating holes (not numbered) are defined in the long side board (322) or the wings (324) to make charcoal burn easily. Lastly, the bottom plate (36) is attached to the enclosing wall at the bottom opening by means of wedges. Preferredly, the enclosing wall is slightly tapered near the bottom opening to limit the bottom plate (36) to fall out of the via the bottom opening and has multiple slits (328) defined on the long side board (322). The bottom plate (36) further has multiple pins (362) formed at edges of the bottom plate (36) to respectively insert into corresponding slits (324) to combine the bottom plate (36) and the enclosing wall together.

Figure 6:
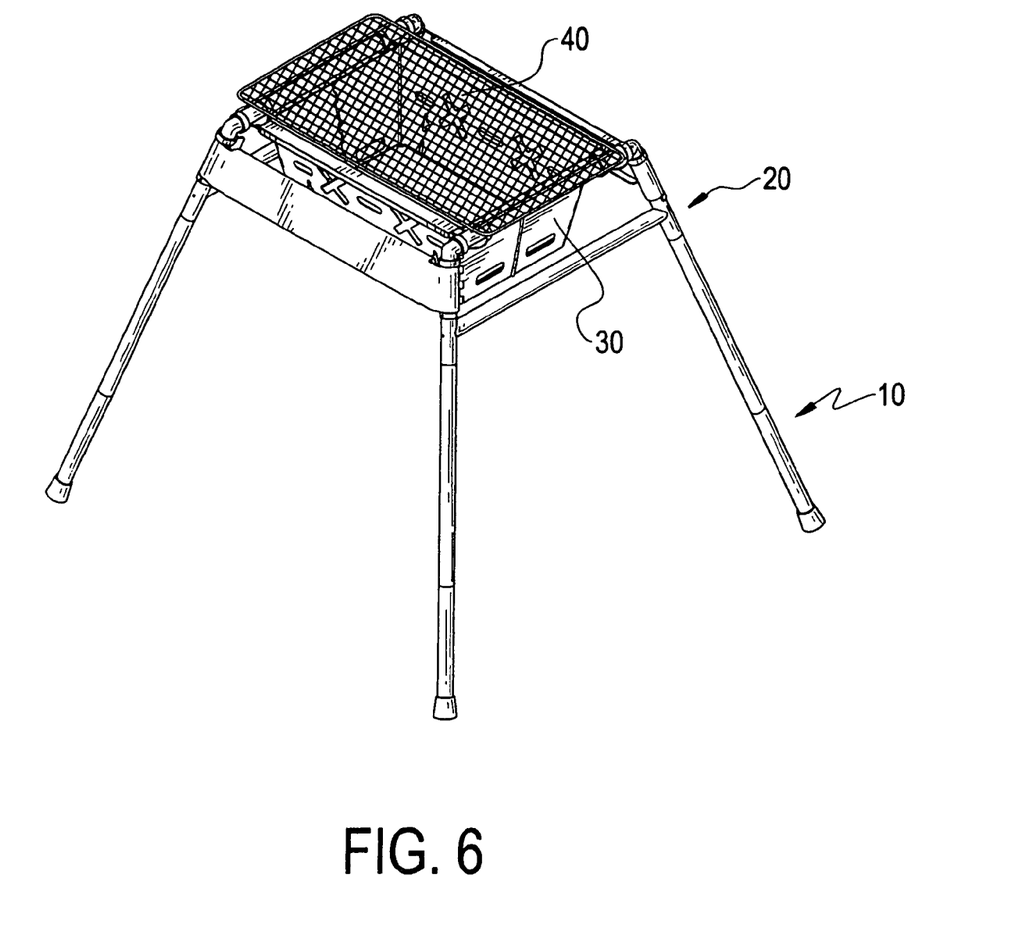
FIG. 6 is a perspective view of the collapsible barbecue grill assembly in combination.
Figure 7:
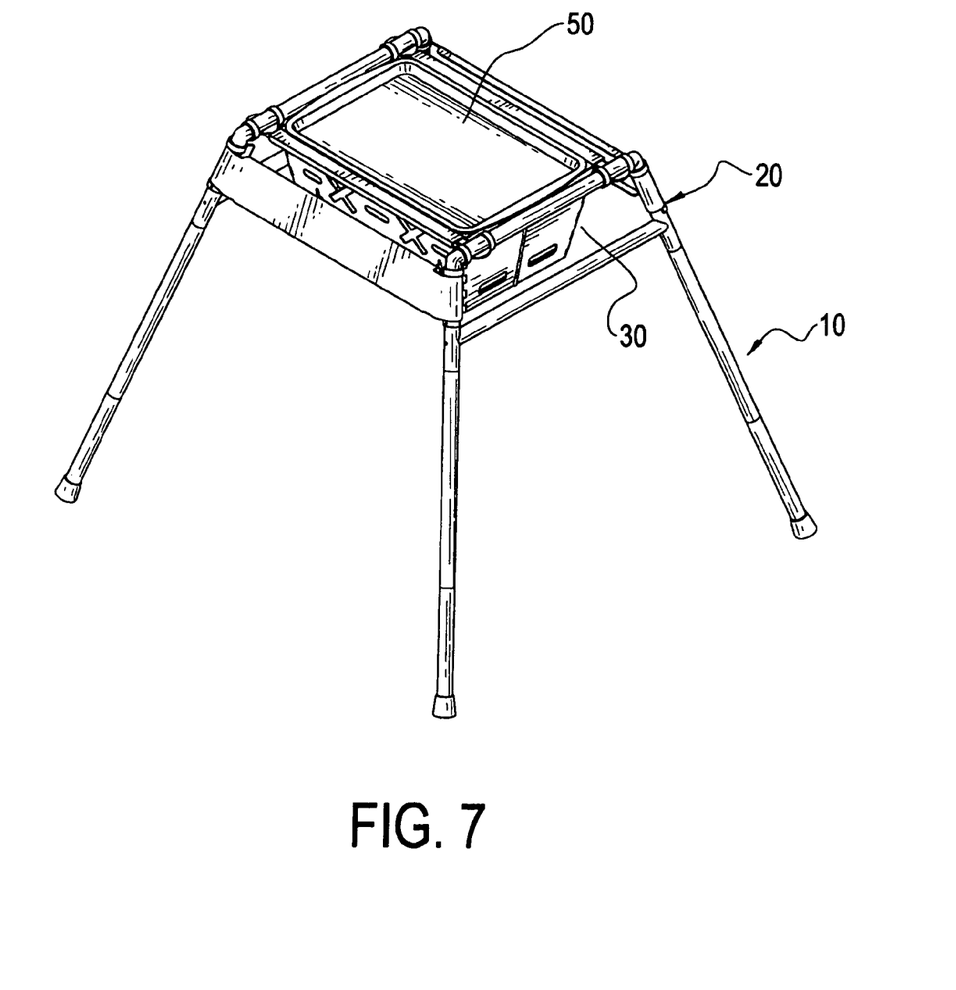
FIG. 7 is a perspective view of the collapsible barbecue grill assembly showing another embodiment.

With further reference to FIG. 6, after the holding strips (34) are mounted on the top rack (20), the charcoal container (30) is enabled to be mounted on the top rack (20) by resting the top flange (326) on the holding strips (34). Lastly, the grill (40) is placed on the top rack (20) over the charcoal container (30) for performing the barbecue. In FIG. 7, the grill (40) is selectively substituted by a metal plate (50).

According to the above description, the collapsible barbecue grill assembly is easily combined by wedging the multiple legs (12) into arms of the top rack (20), extending out the top rack (20) and the charcoal container (30), and resting the holding strips (34), the charcoal container (30), and the grill (40) sequentially on the top rack (30). Additionally, the engaging means of the collapsible barbecue grill assembly in the present invention uses no trivial accessory such as screws, nuts, rods, so that combination of the barbecue grill is rapid and convenient without requiring any tool. Moreover, there is no chance of failure to erect the collapsible assembly as there are no trivial components to be lost.

Although the invention has been explained in relation to multiple preferred embodiments, many other possible modifications and variations can be made without departing from the spirit and scope of the invention as hereinafter claimed.

What is claimed is:

1. A collapsible barbecue grill assembly comprising:
   a top rack (20) composed of two side frames (22a) (22b) and two panels (24a) (24b) pivotally and connecting between the two side frames (22a) (22b), wherein each side frame is a U-shaped frame and has a top and two arms and one of the panels has a curved collar (242) to surround more than half of a circumference of a corresponding one of the arms of the side frame to which the panel is attached to pivotally mount the panel (24) on the arm;
   a leg assembly (10) attached to the top rack (20) to support the top rack (20) and having four legs to respectively and detachably engage with the two arms of the two side frames (22a) (22b); and
   a foldable charcoal container (30) mounted on the top rack (20) composed of two symmetrical bodies (32) pivotally connected with each other to construct an enclosing wall with a bottom opening and a top opening, and a bottom plate (36) attached to the enclosing wall to cover the bottom opening.

2. The collapsible barbecue grill assembly as claimed in claim 1, wherein each symmetrical body (32) of the charcoal container (30) has a long side board (322) with two long sides and two short sides, and two wings (324) are respectively and pivotally attached to the two short sides of the long side board (322); and
   each wing (324) on one of the symmetrical bodies (32) has a distal end pivotally connected to an adjacent distal end of a corresponding one of the wings (324) on the other symmetrical body (32).

3. The collapsible barbecue grill assembly as claimed in claim 1, wherein two holding strips (34) are mounted between two side frames (22a) (22b) on the top rack (20) for resting the charcoal container (30) on the top rack (20), wherein each holding strip (34) has two ends and two curved ears (342) respectively formed on the two ends to hook partial periphery of the tops of the side frames (22a) (22b); and
   a top flange (326) is outwardly formed on the long side board (322) of each symmetrical body (32) near the top opening of the enclosing wall to rest on a corresponding one of the two holding strips (34).

4. The collapsible barbecue grill assembly as claimed in claim 2, wherein two holding strips (34) are mounted between two side frames (22a) (22b) on the top rack (20) for resting the charcoal container (30) on the rack (20), wherein each holding strip (34) has two ends and two curved ears (342) respectively formed on the two ends to hook partial periphery of the tops of the side frames (22a) (22b); and
   a top flange (326) is formed on the long side board (322) of each symmetrical body (32) near the top opening of the enclosing wall to rest on a corresponding one of the two holding strips (34).

5. The collapsible barbecue grill assembly as claimed in claim 4, wherein a horizontal member (26a) (26b) extends between the two arms of each side frame (22a) (22b).

6. The collapsible barbecue grill assembly as claimed in claim 1, wherein each leg is composed of a grounding tube (12) with a connecting end and an abutting end and a middle tube (14) with an engaging end and an inserting end;
   an enlarged rubber foot (122) is attached on the abutting end of the grounding tube (12);
   a frustum (124) is formed on the connecting end of the grounding tube (12) and has a stub (126) formed on an outer periphery of the frustum (124);

the engaging end of the middle tube (14) has an inner diameter slightly smaller than a maximum outer diameter of the frustum (124) to tightly receive the frustum (124) and further has a dent formed inside to mate with the stub (126) of the grounding tube (12);

the inserting end of the middle tube (14) is a frustum (144) with a stub (146); and each arm of the side frame connecting to the leg has an inner diameter slightly smaller than a maximum outer diameter of the inserting end to tightly receive the narrow frustum (144) of the middle tube (14) and further has a dent formed inside to mate with the stub (146) of the middle tube (14).

7. The collapsible barbecue grill assembly as claimed in claim 1, wherein the collapsible barbecue grill assembly further has a grill (40) mounted on the top rack (20) over the charcoal container (30).

8. The collapsible barbecue grill assembly as claimed in claim 1, wherein the collapsible barbecue grill assembly further has a grill plate (50) mounted on the top rack (20) over the charcoal container (30).

* * * * *